Aug. 4, 1942.   C. S. LINCOLN   2,292,327
GYRATING MECHANISM
Filed April 17, 1941

Inventor
Charles S. Lincoln
by Leo Pfeler
Attorney

Patented Aug. 4, 1942

2,292,327

UNITED STATES PATENT OFFICE 2,292,327

GYRATING MECHANISM

Charles S. Lincoln, Wauwatosa, Wis., assignor to Allis-Chalmers Manufacturing Company, Milwaukee, Wis., a corporation of Delaware Application April 17, 1941, Serial No. 388,931

13 Claims. (Cl. 74—61)

This application relates to gyrating mechanisms and is particularly applicable to vibrating screens and the like.

Among the objects of this invention are: to provide a centrifugally gyrated mechanism in which centrifugal forces are balanced with respect to the bearings between the vibrating mechanism and the body to be vibrated; to provide a simple, smooth, balanced, centrifugal vibrating mechanism; and to provide a centrifugal gyrating mechanism in which the rotary driving means is located at the axis of gyration of the system. A more specific object of this invention is to provide a centrifugal gyrating mechanism in which part of the gyrating force may be due to the mass of the driving shaft arranged eccentrically of its bearings, the remainder of the gyrating force being due to eccentric masses carried by the shaft outside of the bearings, the driving means for the shaft having its geometric center located at the axis of gyration of the vibrating system.

Other objects will become apparent from the attached drawing, in which.

Figure 1:
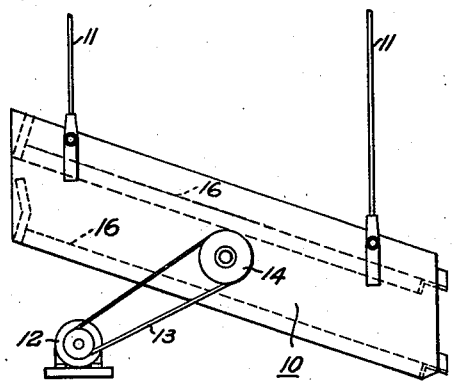
Fig. 1 is an elevation of a vibrating screen to which the gyrating mechanism of the present invention may be applied.

The gyrating mechanism of this invention is illustrated as being applied to a screen 10 suspended from cables 11, for which any other type of yielding support may be substituted. The cables are usually supported from a stationary structure by means of springs (not shown). The gyrating mechanism is driven by motor 12 through belts 13 connected to drive a pulley 14. The screen in this instance is provided with two decks or screen surfaces 16.

Figure 2:
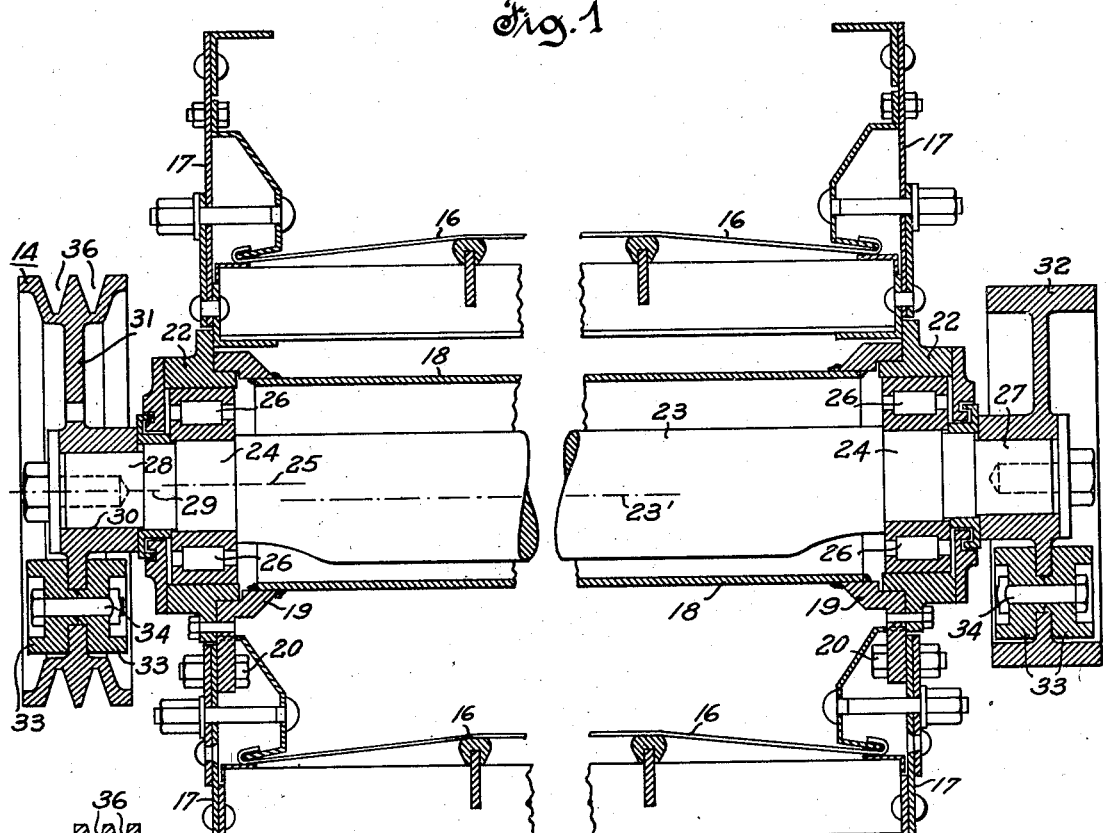
Fig. 2 is a vertical sectional view through the gyrating mechanism applied to a vibrating screen.

Referring to Fig. 2, the gyrating mechanism is enclosed in a hollow cylinder 18 which is supported by annular brackets 19 and is mounted between side plates 17 of the screen body, brackets 19 being connected thereto at 20. Also supported by annular brackets 19 are two bearing housings 22. Massive driving shaft 23 has its end journals 24 carried by antifriction bearings 26 which are enclosed in bearing housing 22. It will be noted that bearings 26 are the sole supports for driving shaft 23. The center of mass of driving shaft 23 is offset from the center line of bearings 26 and journals 24, as indicated by center line 23' of the shaft as compared with center line 25 of journals 24 and bearings 26. The eccentricity of the mass of shaft 23 may form part or all of the eccentric weight required to effect gyration of screen body 10.

Shaft 23 carries at one end thereof an eccentric extension 28, the center line 29 of which is offset from the center line 25 of bearings 26 in the same direction as the eccentricity of the center of mass of shaft 23 from bearing center line 25.

The amount that center line 29 is offset from center line 25 corresponds to the radius of gyration of the system. This results in the axis 29 being coincident with the axis of gyration of the system. Therefore, when sheave 14, which has its central bore 30 fixedly mounted on eccentric 28, is rotated, its axis remains substantially stationary in space during normal vibration of screen body 10. This avoids belt slapping, belt slippage, and non-uniform transmission of power from the motor to the gyrating mechanism. While sheave 14 has been shown as being provided with V-grooves 36 to receive V-belts, it is obvious that any other desired type of belt may be used.

Figure 3:
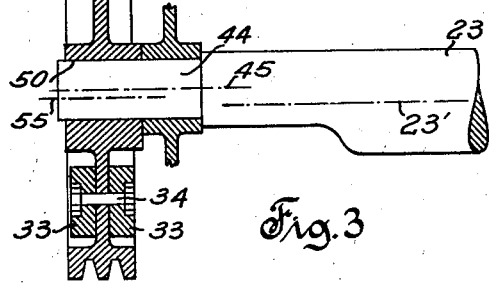
Fig. 3 is a fragmental diagrammatic section of a slightly modified form of gyrating mechanism.

A preferred construction in accordance with this invention utilizes eccentric gyrating masses outside of bearings 26 in addition to the eccentric mass of shaft 23. These additional eccentric masses are illustrated in Fig. 2 as weights 33 which are fastened by bolts 34 to wheels 31 and 32, these wheels being fixedly mounted on shaft extensions 27 and 28, respectively. Shaft extension 27 is shown as being concentric with bearings 26, since this shaft extension does not carry a driving pulley; however, shaft extension 27 may be offset to have the same center as extension 28, so that sheave 14 may be mounted on either side of the screen. In the illustrations of Figs. 2 and 3, the driving pulley 14 has been shown as being integral with the eccentric weight carrying wheels 31 and 51, respectively. It will be understood that the driving pulley may be entirely separate from the eccentric weight carrying wheels 31 or 51.

The centrifugal force due to weights 33 may be approximately equal to the centrifugal force due to eccentric shaft 23, so that the centrifugal forces on both sides of bearings 26 may be equalized. The modification illustrated in Fig. 3 is similar to the construction shown in Fig. 2 except that the eccentricity of the sheave 51 with respect to shaft journal 44 is obtained by locating bore 50 of sheave 54 eccentric to the periphery of the sheave. Therefore, in this case journal 44 may be extended to provide a seat for pulley 54. In the modification of Fig. 3 the center line of journal 44 is indicated at 45 while the center line of the sheave is indicated at 55. Precisely the same eccentricity between the sheave pulley and the shaft bearing is obtained with this construction as in the modification of Fig. 2.

Other modifications, apparent to those skilled in the art, are intended to be included within the purview of this invention within the scope of the appended claims.

It is claimed and desired to secure by Letters Patent:

1. A vibrating system arranged to gyrate about an axis of gyration and comprising a body to be vibrated; yielding means for supporting said body; gyrating means comprising a massive shaft journaled in bearings in said body for vibrating said body in a vertical plane, said shaft being supported solely by said bearings and the center of mass of said shaft being eccentric to said bearings and to the axis of gyration of said vibrating system; and rotary driving means mounted on said shaft, the axis of said driving means being substantially coincident with said axis of gyration of said vibrating system.

2. A vibrating system arranged to gyrate about an axis of gyration and comprising a body to be vibrated; yielding means for supporting said body; a horizontal massive shaft journaled in said body for support solely thereby, the center of mass of said shaft being eccentric to said journals and to the axis of gyration of said system; and rotary driving means attached to said shaft, the central axis of said driving means being coincident with said axis of gyration of said system and being intermediate the central axis of said journals and the center of mass of said shaft.

3. A screen body arranged to gyrate about an axis of gyration and provided with bearings, a massive shaft provided with journals eccentric to the main axis of said shaft and supported entirely by said bearings; and means on said shaft for rotating it, whereby said screen body and shaft gyrate about said axis of gyration, the axis of said rotating means being substantially coincident with said axis of gyration and the main axis of said shaft being eccentric to said axis of gyration.

4. A vibrating screen arranged to gyrate about an axis of gyration and comprising a screen body provided with alined bearings, a massive drive shaft journaled in said bearings and supported solely thereby, the center of gravity of said shaft being eccentric to said bearings, an extension on said shaft and a pulley mounted on said shaft extension, the center of said pulley substantially coinciding with said axis of gyration of said vibrating screen body, said center of gravity of said shaft being eccentric to said axis of gyration.

5. A vibrating screen arranged to gyrate about an axis of gyration and comprising a screen body provided with alined bearings, a massive drive shaft journaled in said bearings and supported solely thereby, an extension on one end of said shaft, the central axis of said shaft extension substantially coinciding with said axis of gyration of said screen body, and a centrally bored pulley mounted on said shaft extension, the center of gravity of said shaft being eccentric to said bearings and to said axis of gyration.

6. A vibrating screen arranged to gyrate about an axis of gyration and comprising a screen body provided with alined bearings, a massive drive shaft journaled in said bearings and supported solely thereby, the center of gravity of said shaft being eccentric to said bearings, said shaft being provided with a portion offset from its main axis and substantially concentric with said axis of gyration of said screen deck, and a centrally bored pulley fixed on said offset shaft portion.

7. A vibrating system arranged to gyrate about an axis of gyration and comprising a body to be vibrated, yieldable means for supporting said body, said body being provided with horizontally alined bearings, a massive drive shaft provided with journals located in and extending beyond said bearings and supported solely thereby, the center of mass of said shaft being eccentric to said journals, an eccentric weight mounted on at least one of said shaft extensions, and a driving pulley supported on one of said shaft extensions, the center of said pulley being substantially coincident with said axis of gyration and eccentric to the center of mass of said shaft.

8. A vibrating system as defined in claim 7 in which at least one of said eccentric weights is combined with said pulley.

9. A vibrating system arranged to gyrate about an axis of gyration and comprising a yieldably supported body provided with horizontally alined bearings, a massive shaft journaled in said bearings and extending through and beyond said bearings, the center of mass of said shaft being eccentric to said bearings, an eccentric weight mounted on each of said shaft extensions, the sum of the moments of said eccentric weights about said bearings being in the same radial direction as and equal to the moment about said bearings due to the mass of the shaft, and a driving pulley on one end of said shaft, the center of said pulley substantially coinciding with said axis of gyration of said system and being eccentric to the main axis of said shaft.

10. A vibrating system comprising a yieldingly supported body provided with alined bearings, a shaft supported solely by said bearings and extending therethrough, an eccentric mass integral with said shaft between said bearings, a separate eccentric mass fixed on said shaft extension beyond at least one of said bearings, whereby rotation of said shaft causes gyration of said system about an axis of gyration, and a pulley for rotating said shaft mounted on said shaft, the center of said pulley substantially coinciding with said axis of gyration of said system, the mass of said shaft being displaced from said axis of gyration in the same direction as said separate eccentric mass.

11. A vibrating system comprising a yieldingly supported body provided with alined bearings, a shaft supported solely by said bearings and extending therethrough, an intermediate eccentric mass on said shaft between said bearings, a separate eccentric mass fixed on a shaft extension beyond at least one of said bearings, whereby rotation of said shaft causes gyration of said system about an axis of gyration, one of said shaft extensions being provided with an eccentric the center of which substantially coincides with said axis of gyration, and a centrally bored pulley mounted on said eccentric, the center of mass of said shaft and its said intermediate eccentric mass being eccentric to said axis of gyration in a direction opposite to the center line of said bearings.

12. A vibrating system arranged to vibrate with a predetermined radius of gyration about an axis of gyration and comprising a yieldingly supported body provided with alined bearings, a massive shaft supported solely in and extending beyond said bearings, the portion of said shaft intermediate said bearings having its axis offset from the center line of said bearings by a distance substantially larger than said radius of gyration, separate eccentric weights carried by said shaft outside said bearings and arranged in the same radial direction from said bearings as said intermediate shaft axis, said shaft being provided with an extension concentric with said axis of gyration, and a centrally bored rotatable driving pulley mounted on said extension.

13. A vibrating system as defined in claim 12 wherein the masses of said intermediate portion of said shaft and said eccentric weights and their distances from the center line of the bearings are so related that the gyrating force due to said intermediate portion of said shaft is substantially equal to the gyrating force due to said eccentric weights.

CHARLES S. LINCOLN.